(12) United States Patent
Abe et al.

(10) Patent No.: US 10,378,272 B2
(45) Date of Patent: Aug. 13, 2019

(54) GLASS PANEL UNIT, TEMPORARY ASSEMBLY OF GLASS PANEL UNIT, COMPLETED ASSEMBLY OF GLASS PANEL UNIT, METHOD FOR MANUFACTURING GLASS PANEL UNIT

(71) Applicant: Panasonic Intellectual Property Management Co., Ltd., Osaka (JP)

(72) Inventors: Hiroyuki Abe, Osaka (JP); Eiichi Uriu, Osaka (JP); Kenji Hasegawa, Osaka (JP); Tasuku Ishibashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 178 days.

(21) Appl. No.: 15/512,714

(22) PCT Filed: Sep. 30, 2015

(86) PCT No.: PCT/JP2015/004963
§ 371 (c)(1),
(2) Date: Mar. 20, 2017

(87) PCT Pub. No.: WO2016/051787
PCT Pub. Date: Apr. 7, 2016

(65) Prior Publication Data
US 2017/0298681 A1 Oct. 19, 2017

(30) Foreign Application Priority Data
Sep. 30, 2014 (JP) ................................. 2014-200967

(51) Int. Cl.
*E06B 3/677* (2006.01)
*C03C 27/10* (2006.01)
(Continued)

(52) U.S. Cl.
CPC .............. *E06B 3/677* (2013.01); *C03C 27/10* (2013.01); *E06B 3/6612* (2013.01);
(Continued)

(58) Field of Classification Search
CPC .. E06B 3/6612; E06B 3/6736; E06B 3/67365; E06B 3/677; E06B 3/66328; Y02B 80/24
See application file for complete search history.

(56) References Cited

U.S. PATENT DOCUMENTS 3,990,201 A * 11/1976 Falbel .................. E06B 3/6612
52/171.3
2014/0037869 A1 2/2014 Petrmichl et al.
(Continued)

FOREIGN PATENT DOCUMENTS

JP 2001-206740 A 7/2001
JP 2001-342043 A 12/2001
(Continued)

OTHER PUBLICATIONS

International Search Report issued in Application No. PCT/JP2015/004963 dated Dec. 8, 2015, with English translation.

*Primary Examiner* — Donald J Loney
(74) *Attorney, Agent, or Firm* — McDermott Will & Emery LLP

(57) ABSTRACT

The glass panel unit is a predetermined part separated from a completed assembly obtained by subjecting a temporary assembly to a predetermined process. In the temporary assembly, the inside space (500) enclosed by the first and second glass substrates and the frame is divided into the first space and the second space with the partition and the gas adsorbent is inside the first space. The predetermined process includes: converting the first space into the evacuated space by evacuating the first space through the gas passage, the second space, and the outlet; and changing a shape of the partition to close the gas passage to form the seal enclosing
(Continued)

the evacuated space. The predetermined part includes: a first and second glass panels being parts of the first and second glass substrates; the seal; the evacuated space; and the gas adsorbent.

7 Claims, 11 Drawing Sheets

(51) Int. Cl.
    *E06B 3/66*         (2006.01)
    *E06B 3/673*       (2006.01)

(52) U.S. Cl.
    CPC ........ *E06B 3/6736* (2013.01); *E06B 3/67365* (2013.01); *Y02A 30/25* (2018.01); *Y02B 80/24* (2013.01)

(56) References Cited

U.S. PATENT DOCUMENTS

| | | |
|---|---|---|
| 2015/0068665 A1 | 3/2015 | Abe et al. |
| 2015/0068666 A1 | 3/2015 | Abe et al. |

FOREIGN PATENT DOCUMENTS

| | | |
|---|---|---|
| JP | 2003-507845 A | 2/2003 |
| JP | 2008-063158 A | 3/2008 |
| JP | 2013-088036 A | 5/2013 |
| WO | 01/12942 A1 | 2/2001 |
| WO | 2013/172033 A1 | 11/2013 |
| WO | 2013/172034 A1 | 11/2013 |
| WO | 2014/022106 A1 | 2/2014 |

\* cited by examiner tion No. PCT/JP2015/
GLASS PANEL UNIT, TEMPORARY ASSEMBLY OF GLASS PANEL UNIT, COMPLETED ASSEMBLY OF GLASS PANEL UNIT, METHOD FOR MANUFACTURING GLASS PANEL UNIT

RELATED APPLICATIONS

This application is the U.S. National Phase under 35 U.S.C. § 371 of International Application No. PCT/JP2015/004963, filed on Sep. 30, 2015, which in turn claims the benefit of Japanese Application No. 2014-200967, filed on Sep. 30, 2014, the disclosures of which are incorporated by reference herein.

TECHNICAL FIELD

The present invention relates to glass panel units, temporary assemblies of glass panel unit, completed assemblies of glass panel unit, and method for manufacturing glass panel unit.

BACKGROUND ART

Document 1 (WO 2013/172034 A1) discloses a multiple glass pane. The multiple glass pane disclosed in Document 1 has a reduced pressure space formed between a pair of glass plates.

The reduced pressure space is made by evacuating a space between the pair of glass plates with a vacuum pump. To evacuate the space between the pair of glass plates with the vacuum pump, it is necessary to form an outlet in one of the pair of glass panels in advance and connect the outlet to an inlet of the vacuum pump with an evacuation pipe.

In Document 1, subsequent to the evacuation the space is divided by a region forming member placed inside the space to form a partial region not including the outlet. After that, the pair of glass plates are cut to separate the partial region. As a result, a multiple glass pane devoid of an outlet and an evacuation pipe can be produced.

According to Document 1, heating the region forming member is necessary to form the partial region. However, heating the region forming member may result in emission of gas from the region forming member. After formation of the partial region, it is very difficult to improve the degree of vacuum of the partial region by use of the vacuum pump and therefore the degree of vacuum of the partial region is likely to become worse due to emission of gas from the region forming member. Hence, in some cases multiple glass panes may fail to have desired thermal insulating properties.

SUMMARY OF INVENTION

An object to be solved by the present invention would be to propose a glass panel unit which does not have an outlet and an evacuation pipe but has improved thermal insulating properties.

The glass panel unit of one aspect according to the present invention is a predetermined part separated from a completed assembly obtained by subjecting a temporary assembly to a predetermined process. The temporary assembly includes: a first glass substrate; a second glass substrate placed opposite the first glass substrate; a frame placed between the first glass substrate and the second glass substrate to hermetically bond the first glass substrate and the second glass substrate to each other; an inside space enclosed by the first glass substrate, the second glass substrate, and the frame; a partition dividing the inside space into a first space and a second space; a gas passage formed inside the inside space to interconnect the first space and the second space; an outlet interconnecting the second space and an outside space; and a gas adsorbent placed in the first space and including a getter. The predetermined process includes: converting the first space into an evacuated space by evacuating the first space through the gas passage, the second space, and the outlet; and changing a shape of the partition to close the gas passage to form a separator separating the evacuated space from the second space so that part of the frame corresponding to the evacuated space and the separator constitute a seal hermetically bonding the first glass substrate and the second glass substrate so as to enclose the evacuated space. The predetermined part includes: a first glass panel which is part of the first glass substrate that corresponds to the evacuated space; a second glass panel which is part of the second glass substrate that corresponds to the evacuated space; the seal; the evacuated space; and the gas adsorbent.

The temporary assembly, of another aspect according to the present invention, of a glass panel unit, is a temporary assembly for producing the glass panel unit of the above aspect. The temporary assembly includes: a first glass substrate; a second glass substrate placed opposite the first glass substrate; a frame placed between the first glass substrate and the second glass substrate to hermetically bond the first glass substrate and the second glass substrate to each other; an inside space enclosed by the first glass substrate, the second glass substrate, and the frame; a partition dividing the inside space into a first space and a second space; a gas passage interconnecting the first space and the second space in the inside space; an outlet interconnecting the second space and an outside space; and a gas adsorbent placed in the first space and including a getter.

The completed assembly, of another aspect according to the present invention, of a glass panel unit is a completed assembly for producing the glass panel unit of the above aspect. The completed assembly includes: a first glass substrate; a second glass substrate placed opposite the first glass substrate; a frame placed between the first glass substrate and the second glass substrate to hermetically bond the first glass substrate and the second glass substrate to each other; an inside space enclosed by the first glass substrate, the second glass substrate, and the frame; a separator dividing the inside space into an evacuated space and a second space; an outlet interconnecting the second space and an outside space; and a gas adsorbent placed in the evacuated space and including a getter. The separator is formed by changing a shape of a partition dividing the inside space into a first space and the second space, subsequent to evacuating the first space through a gas passage interconnecting the first space and the second space in the inside space, the second space, and the outlet, to convert the first space into the evacuated space, so as to close the gas passage.

The method, of another aspect according to the present invention, for manufacturing glass panel unit, includes: an assembling step of preparing a temporary assembly including: a first glass substrate; a second glass substrate placed opposite the first glass substrate; a frame placed between the first glass substrate and the second glass substrate to hermetically bond the first glass substrate and the second glass substrate to each other; an inside space enclosed by the first glass substrate, the second glass substrate, and the frame; a partition dividing the inside space into a first space and a second space; a gas passage interconnecting the first space and the second space; an outlet interconnecting the second space and an outside space; and a gas adsorbent including a getter; a hermetically enclosing step of obtaining a completed assembly by: converting the first space into an evacuated space by evacuating the first space through the gas passage, the second space, and the outlet and changing a shape of the partition to close the gas passage to form a separator so that part of the frame corresponding to the evacuated space and the separator constitute a seal hermetically bonding the first glass substrate and the second glass substrate so as to enclose the evacuated space; and a removing step of removing part including the second space from the completed assembly to obtain a glass panel unit which is a predetermined part including the evacuated space.

DESCRIPTION OF EMBODIMENTS

The following disclosure relates to glass panel units, temporary assemblies of glass panel unit, completed assemblies of glass panel unit, and methods for manufacturing glass panel unit, and particularly to a thermally insulating glass panel unit, a temporary assembly of the glass panel unit, a completed assembly of the glass panel unit, and a method for manufacturing glass panel unit.

1. Embodiments

[1-1. Configuration]

Figure 1:
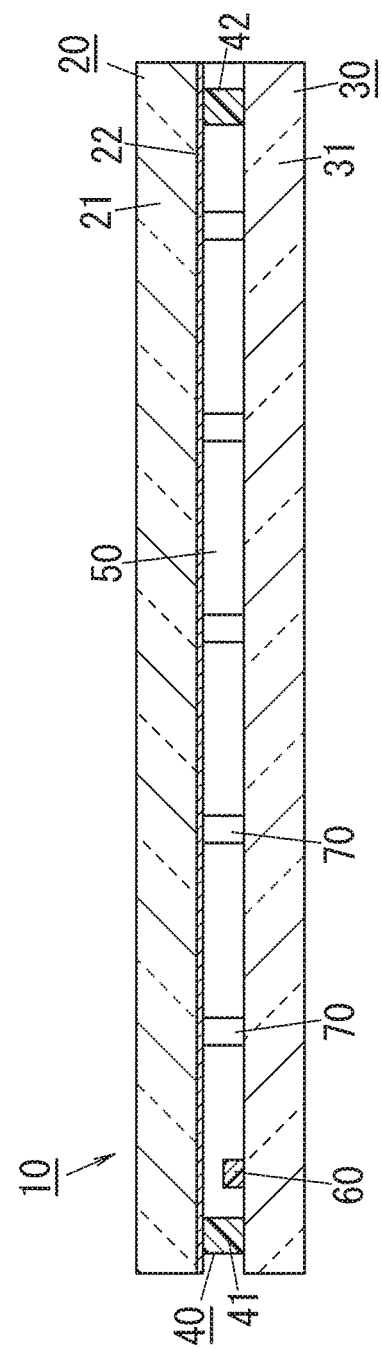
FIG. 1 is a schematic section of the glass panel unit of one embodiment according to the present invention.
Figure 2:
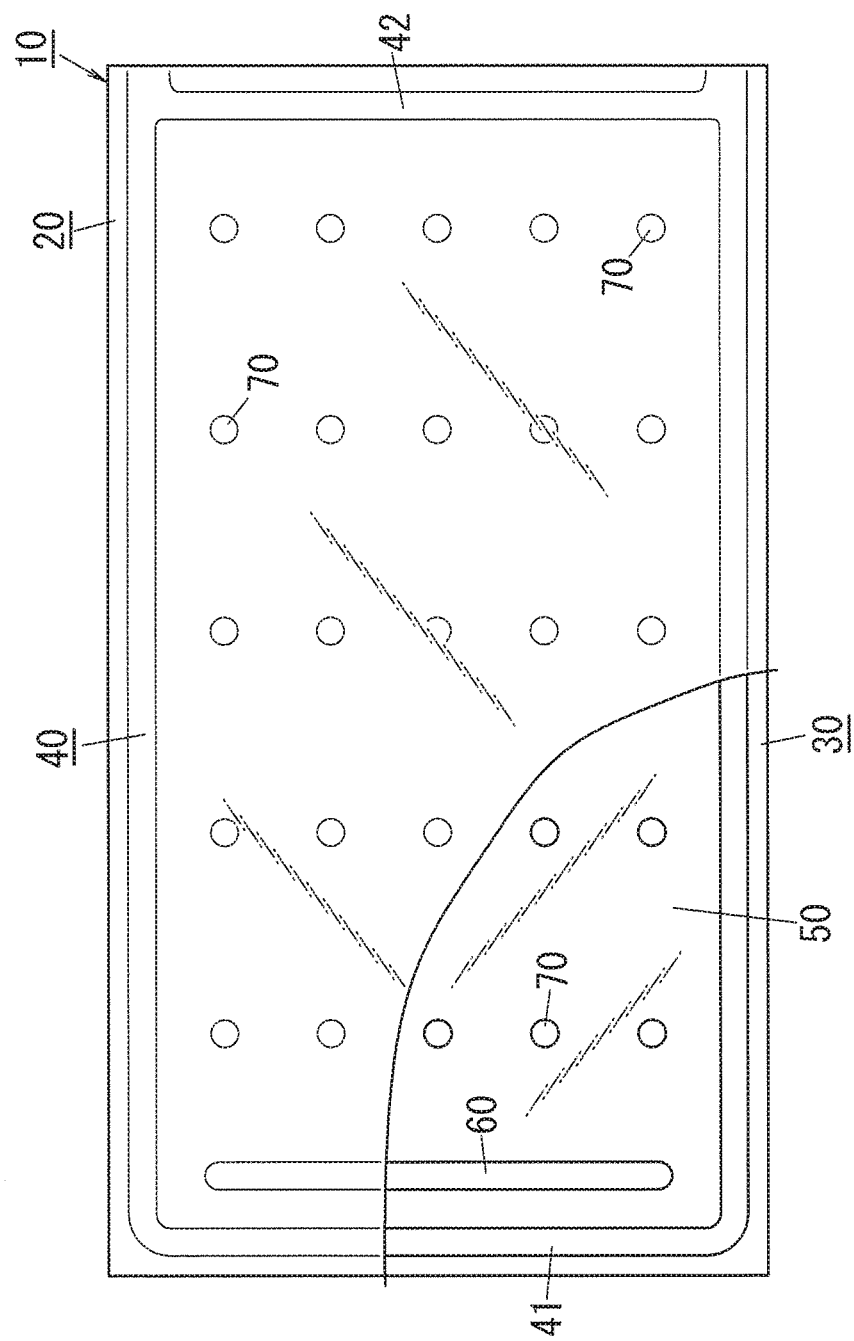
FIG. 2 is a schematic plan of the glass panel unit of the embodiment.

FIG. 1 and FIG. 2 show a glass panel unit (a finished product of glass panel unit) 10 of one embodiment according to the present invention. The glass panel unit 10 of the present embodiment is a vacuum insulated glass unit. The vacuum insulated glass unit is a type of multiple glass panels including at least one pair of glass panels, and includes an evacuated space between the pair of glass panels.

The glass panel unit 10 of the present embodiment includes a first glass panel 20, a second glass panel 30, a seal 40, an evacuated space 50, a gas adsorbent 60, and multiple spacers 70.

Figure 5:
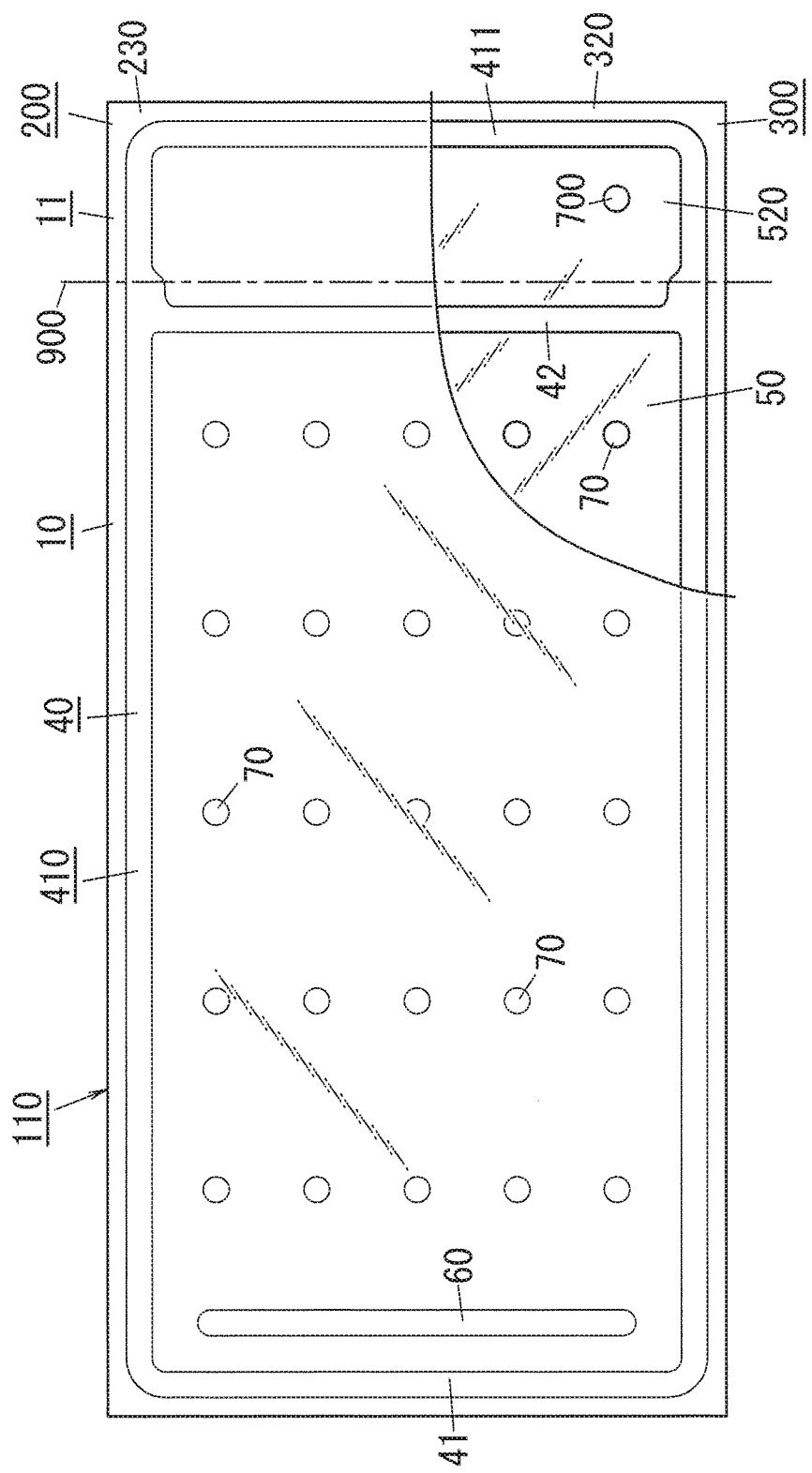
FIG. 5 is a schematic plan of the completed assembly of the glass panel unit of the embodiment.
Figure 11:
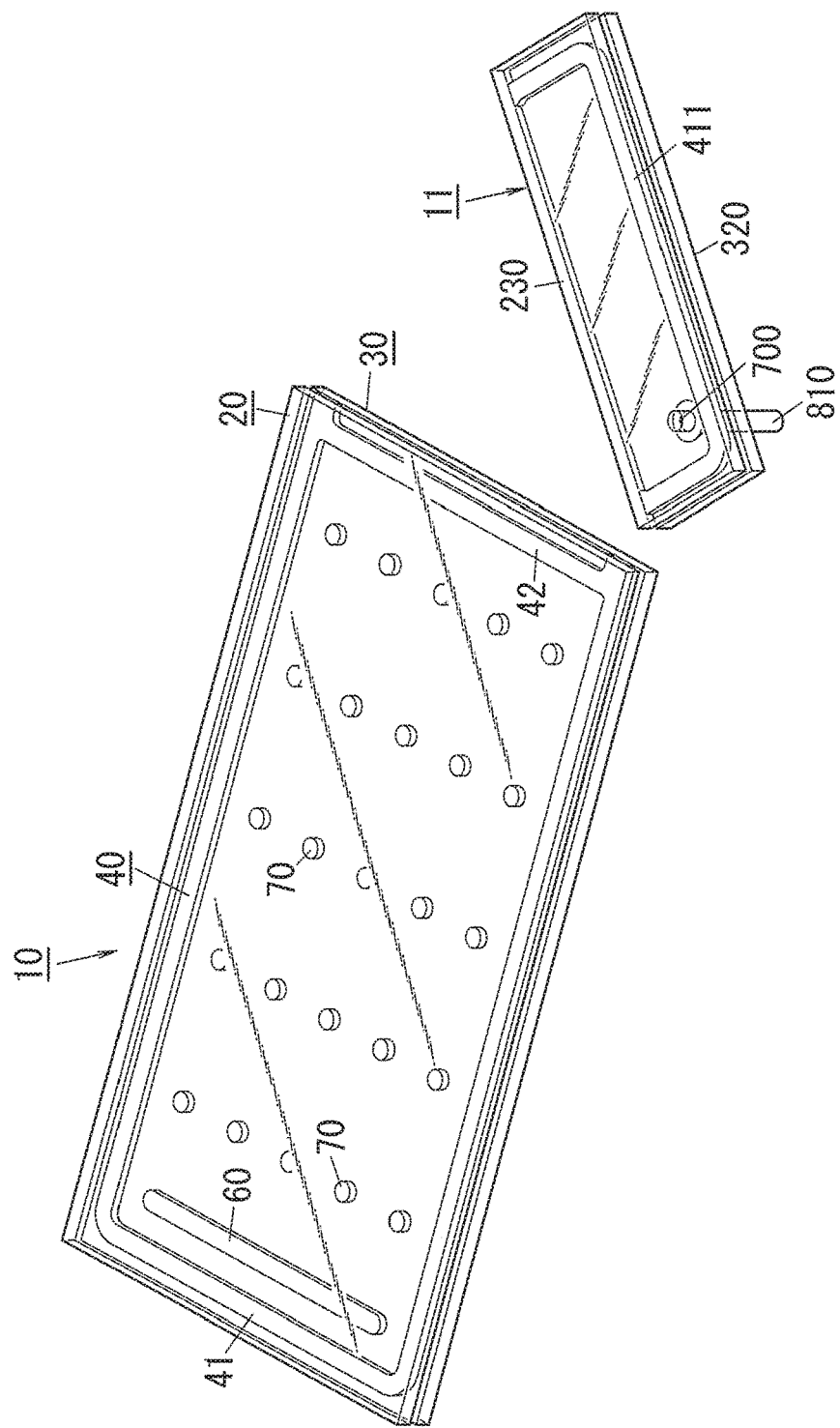
FIG. 11 is another explanatory view of the method for manufacturing the glass panel unit of the embodiment.

The glass panel unit 10 of the present embodiment is a predetermined part separated from a completed assembly 110 shown in FIG. 5. In more detail, the glass panel unit 10 of the present embodiment is defined as remaining part obtained by removing an unnecessary part 11 from the completed assembly 110, as shown in FIG. 11.

Figure 3:
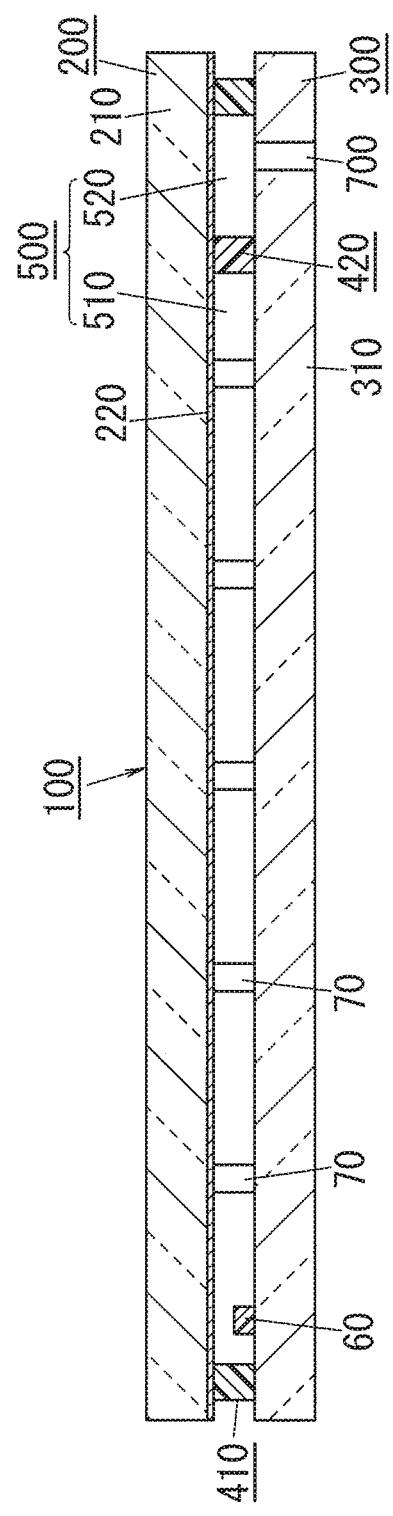
FIG. 3 is a schematic section of the temporary assembly of the glass panel unit of the embodiment.
Figure 4:
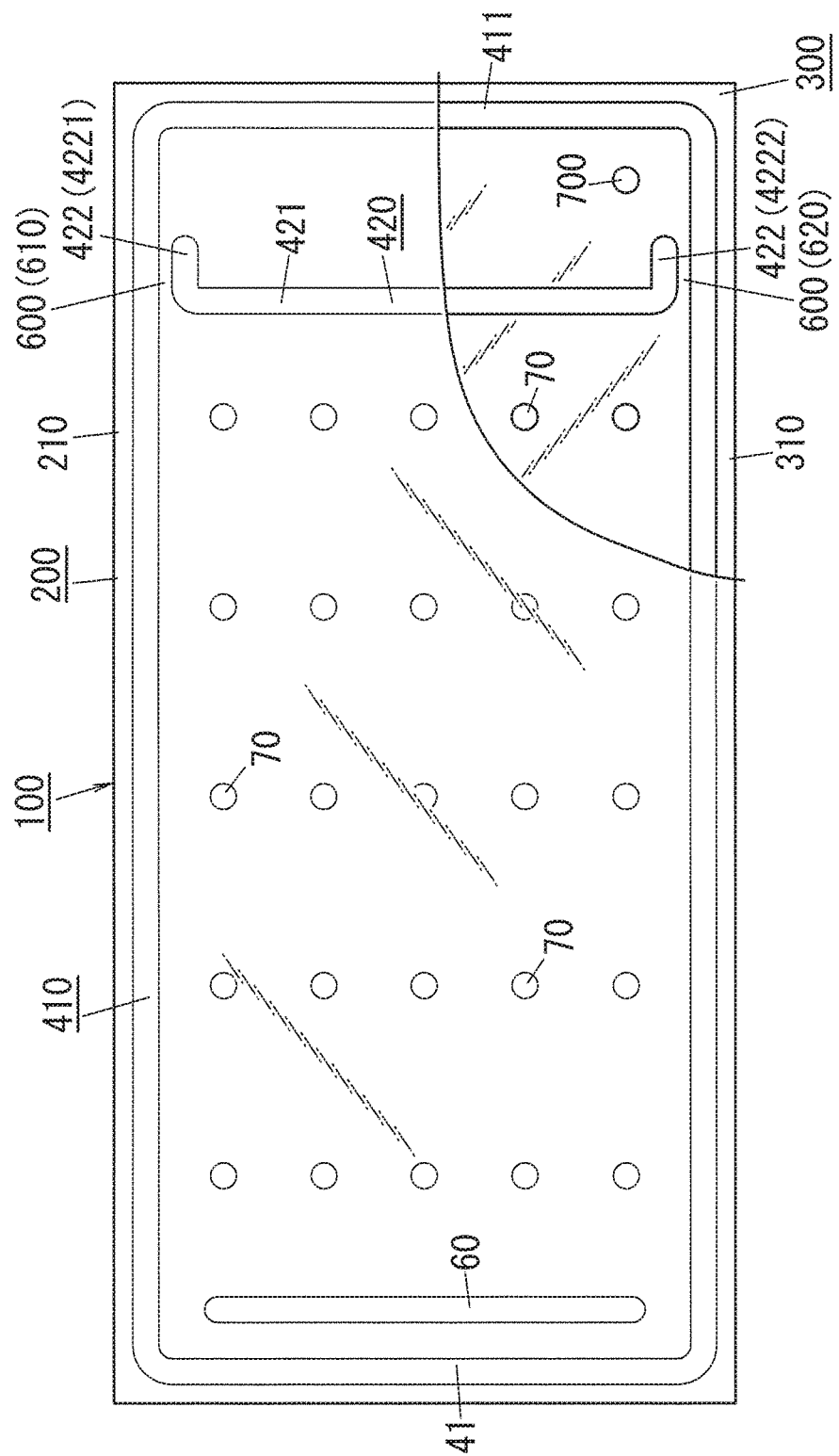
FIG. 4 is a schematic plan of the temporary assembly.

The completed assembly 110 is obtained by subjecting a temporary assembly 100 shown in FIG. 3 and FIG. 4 to a predetermined process.

The temporary assembly 100 includes a first glass substrate 200, a second glass substrate 300, a frame 410, an inside space 500, a partition 420, a gas passage 600, an outlet 700, a gas adsorbent 60, and multiple spacers 70.

The first glass substrate 200 includes a glass plate 210 determining a plan shape of the first glass substrate 200, and a coating 220.

The glass plate 210 is a rectangular flat plate and includes a first face (lower face in FIG. 3) and a second face (upper face in FIG. 3) in a thickness direction which are parallel to each other. Each of the first face and the second face of the glass plate 210 is a flat face. Examples of material of the glass plate 210 may include soda lime glass, high strain point glass, chemically strengthened glass, non-alkaline glass, quartz glass, neoceram, and physically strengthened glass.

The coating 220 is formed on the first face of the glass plate 210. The coating 220 is a light-transmissive infrared reflective film. Note that, the coating 220 is not limited to such an infrared reflective film but may be a film with desired physical properties.

The second glass substrate 300 includes a glass plate 310 determining a plan shape of the second glass substrate 300. The glass plate 310 is a rectangular flat plate and includes a first face (upper face in FIG. 3) and a second face (lower face in FIG. 3) in a thickness direction which are parallel to each other. Each of the first face and the second face of the glass plate 310 is a flat face.

The glass plate 310 has the same plan shape and plan size as the glass plate 210 (in other words, the second glass substrate 300 has the same plan shape as the first glass substrate 200). Further, the glass plate 310 has the same thickness as the glass plate 210. Examples of material of the glass plate 310 may include soda lime glass, high strain point glass, chemically strengthened glass, non-alkaline glass, quartz glass, neoceram, and physically strengthened glass.

The second glass substrate 300 includes the glass plate 310 only. In other words, the glass plate 310 forms the second glass substrate 300 by itself. The second glass substrate 300 is placed opposite the first glass substrate 200. In more detail, the first glass substrate 200 and the second glass substrate 300 are arranged so that the first face of the glass plate 210 and the first face of the glass plate 310 face and parallel to each other.

The frame 410 is placed between the first glass substrate 200 and the second glass substrate 300 to hermetically bond the first glass substrate 200 and the second glass substrate 300 to each other. Thereby, the inside space 500 enclosed by the frame 410, the first glass substrate 200, and the second glass substrate 300 is formed.

The frame 410 is formed of thermal adhesive (first thermal adhesive with a first softening point). Examples of the first thermal adhesive may include glass frit. Examples of the glass frit may include low-melting-point glass frit. Examples of the low-melting-point glass frit may include bismuth-based glass frit, lead-based glass frit, and vanadium-based glass frit.

The frame 410 has a rectangular frame shape. The frame 410 has the same plan shape as each of the glass plates 210 and 310, but the frame 410 has a smaller plan size than each of the glass plates 210 and 310. The frame 410 is formed to extend along an outer periphery of the second glass substrate 300. In other words, the frame 410 is formed to cover an almost entire region on the second glass substrate 300.

The first glass substrate 200 and the second glass substrate 300 are hermetically bonded with the frame 410 by once melting the first thermal adhesive of the frame 410 at a predetermined temperature (first melting temperature) Tm1 equal to or higher than the first softening point.

The partition 420 is placed inside the inside space 500. The partition 420 divides the inside space 500 into a first space (evacuation space) 510 and a second space (gas passage space) 520. The first space 510 is a space to be evacuated later, and the second space 520 is a space used for evacuating the first space 510. The partition 420 is formed between a first end (right end in FIG. 4) and a center of the second glass substrate 300 in a lengthwise direction (left and right direction in FIG. 4) of the second glass substrate 300 so that the first space 510 is larger than the second space 520.

The partition 420 includes a wall part 421 and a pair of closing parts 422 (a first closing part 4221 and a second closing part 4222). The wall part 421 is formed to extend along a width direction (upward and downward direction in FIG. 4) of the second glass substrate 300. Note that, the wall part 421 has opposite ends in a lengthwise direction not in contact with the frame 410. The pair of closing parts 422 extends from the opposite ends in the lengthwise direction of the wall part 421 toward the first end in the lengthwise direction of the second glass substrate 300.

The partition 420 is formed of thermal adhesive (second thermal adhesive with a second softening point). Examples of the second thermal adhesive may include glass frit. Examples of the glass frit may include low-melting-point glass frit. Examples of the low-melting-point glass frit may include bismuth-based glass frit, lead-based glass frit, and vanadium-based glass frit. The second thermal adhesive is same as the first thermal adhesive, and the second softening point is equal to the first softening point.

The gas passage 600 interconnects the first space 510 and the second space 520 in the inside space 500. The gas passage 600 includes a first gas passage 610 and a second gas passage 620. The first gas passage 610 is a space formed between the first closing part 4221 and part of the frame 410 facing the first closing part 4221. The second gas passage 620 is a space formed between the second closing part 4222 and part of the frame 410 facing the second closing part 4222.

The outlet 700 is a hole interconnecting the second space 520 and an outside space. The outlet 700 is used for evacuating the first space 510 by way of the second space 520 and the gas passage 600. Therefore, the gas passage 600, the second space 520, and the outlet 700 constitute an evacuation passage for evacuating the first space 510. The outlet 700 is formed in the second glass substrate 300 to interconnect the second space 520 and the outside space. In more detail, the outlet 700 is positioned in a corner of the second glass substrate 300.

The gas adsorbent 60 is placed inside the first space 510. In more detail, the gas adsorbent 60 has an elongated flat plate shape, and is formed on a second end (left end in FIG. 5) in the lengthwise direction of the second glass substrate 300 to extend along the width direction of the second glass substrate 300. In summary, the gas adsorbent 60 is placed on one end of the first space 510 (the evacuated space 50). According to this arrangement, the gas adsorbent 60 can be unlikely to be perceived. Further, the gas adsorbent 60 is positioned away from the partition 420 and the gas passage 600. Hence, it is possible to lower a probability that the gas adsorbent 60 prevents evacuation of the first space 510.

The gas adsorbent 60 is used to adsorb unnecessary gas (for example, residual gas). The unnecessary gas may include gas emitted from the frame 410 and the partition 420 when heated.

The gas adsorbent 60 includes a getter. The getter is a substance having properties of adsorbing molecules smaller than a predetermined size. The getter may be an evaporative getter. The evaporative getter has properties of desorbing adsorbed molecules when having a temperature equal to or higher than a predetermined temperature (activation temperature). Therefore, even if the adsorbability of the evaporative getter has been decreased, the adsorbability of the evaporative getter can be recovered by heating the evaporative getter to a temperature equal to or higher than the activation temperature. Examples of the evaporative getter may include zeolite and ion-exchanged zeolite (for example, copper ion-exchanged zeolite).

The gas adsorbent 60 includes a powder of this getter. In more detail, the gas adsorbent 60 may be formed by: applying a liquid containing a powder of the getter; and solidifying it. Examples of the liquid containing a powder of the getter may include dispersion liquid prepared by dispersing a powder of the getter in a liquid and a solution prepared by dissolving a powder of the getter in a liquid. In this case, the gas adsorbent 60 can be downsized. Therefore, the gas adsorbent 60 can be placed even if the evacuated space 50 is small.

The multiple spacers 70 are used to keep a predetermined interval between the first glass substrate 200 and the second glass substrate 300. In other words, the multiple spacers 70 are used to keep a distance between the first glass panel 20 and the second glass panel 30 to a desired value.

The multiple spacers 70 are placed inside the first space 510. In more detail, the multiple spacers 70 are placed at individual intersections of an imaginary rectangular lattice. For example, an interval between the multiple spacers 70 is 2 cm. Note that, sizes of the spacers 70, the number of spacers 70, intervals between the spacers 70, and pattern of arrangement of the spacers 70 may be appropriately determined.

Each spacer 70 has a solid cylindrical shape with a height almost equal to the aforementioned predetermined interval. For example, each spacer 70 has a diameter of 1 mm and a height of 100 μm. Note that, each spacer 70 may have a desired shape such as a solid prismatic shape and a spherical shape.

Each spacer 70 is made of light-transmissive material. Note that, each spacer 70 may be made of opaque material, providing that it is sufficiently small. Material of the spacers 70 is selected so that deformation of the spacers 70 does not occur during a first melting step, an evacuating step, and a second melting step which are described later. For example, the material of the spacers 70 is selected to have a softening point (softening temperature) higher than the first softening point of the first thermal adhesive and the second softening point of the second thermal adhesive.

The aforementioned temporary assembly 100 is subjected to the above predetermined process to obtain the completed assembly 110.

The above predetermined process includes converting the first space 510 into the evacuated space 50 by evacuating the first space 510 by way of the gas passage 600, the second space 520, and the outlet 700 at a predetermined temperature (an evacuation temperature) Te. The evacuation temperature Te is higher than the activation temperature of the getter of the gas adsorbent 60. Consequently, evacuation of the first space 510 and recovery of the adsorbability of the getter can be performed simultaneously.

The above predetermined process further includes forming the seal 40 enclosing the evacuated space 50 by forming a separator 42 for closing the gas passage 600 by changing a shape of the partition 420 (see FIG. 5). The partition 420 includes the second thermal adhesive. Therefore, the separator 42 can be formed by changing the shape of the partition 420 by once melting the second thermal adhesive at a predetermined temperature (a second melting temperature) Tm2 equal to or higher than the second softening point. Note that, the first melting temperature Tm1 is lower than the second melting temperature Tm2. Consequently, it is possible to prevent the gas passage 600 from being closed due to deformation of the partition 420 in bonding the first glass substrate 200 and the second glass substrate 300 with the frame 410.

The partition 420 is changed in shape so that the first closing part 4221 closes the first gas passage 610 and the second closing part 4222 closes the second gas passage 620. The separator 42, which is obtained by changing the shape of the partition 420 as described above, separates (spatially) the evacuated space 50 from the second space 520. The separator (second part) 42 and part (first part) 41 of the frame 410 corresponding to the evacuated space 50 constitute the seal 40 enclosing the evacuated space 50.

The completed assembly 110 obtained in the aforementioned manner includes, as shown in FIG. 5, the first glass substrate 200, the second glass substrate 300, the seal 40, the evacuated space 50, the second space 520, the gas adsorbent 60, the multiple spacers 70, and the outlet 700.

The evacuated space 50 is obtained by evacuating the first space 510 by way of the second space 520 and the outlet 700 as described above. In other words, the evacuated space 50 is defined as the first space 510 with a degree of vacuum equal to or lower than a predetermined value. The predetermined value may be 0.1 Pa, for example. The evacuated space 50 is hermetically enclosed by the first glass substrate 200, the second glass substrate 300, and the seal 40 completely and thus is separated from the second space 520 and the outlet 700.

The seal 40 encloses the evacuated space 50 completely and bonds the first glass substrate 200 and the second glass substrate 300 to each other hermetically. The seal 40 has a rectangular frame shape, and includes the first part 41 and the second part 42. The first part 41 is part of the frame 410 corresponding to the evacuated space 50. In other words, the first part 41 is part of the frame 410 facing the evacuated space 50. The first part 41 has an almost U-shape, and serves as three of four sides of the seal 40. The second part 42 is a separator formed by changing the shape of the partition 420. The second part 42 has an I-shape, and serves as a remaining one of the four sides of the seal 40.

Thus-obtained completed assembly 110 is cut along a cutting line 900 shown in FIG. 5, and thereby divided into part (glass panel unit) 10 including the evacuated space 50 and other part (unnecessary part) 11 including the second space 520 as shown in FIG. 11.

The unnecessary part 11 mainly includes part 230 of the first glass substrate 200 corresponding to the second space 520, part 320 of the second glass substrate 300 corresponding to the second space 520, and part 411 of the frame 410 corresponding to the second space 520. Note that, in consideration of production cost of the glass panel unit 10, the unnecessary part 11 is preferably as small as possible.

As shown in FIG. 1 and FIG. 2, the glass panel unit 10 includes the first glass panel 20, the second glass panel 30, the seal 40, the evacuated space 50, the gas adsorbent 60, and the multiple spacers 70. Note that, the seal 40, the evacuated space 50, the gas adsorbent 60, and the multiple spacers 70 are already described and thus hereinafter are not described in detail.

The first glass panel 20 is part of the first glass substrate 200 corresponding to the evacuated space 50. The first glass panel 20 includes a body 21 determining a plan shape of the first glass panel 20, and a coating 22.

The body 21 is part of the glass plate 210 of the first glass substrate 200 corresponding to the evacuated space 50. The body 21 is of the same material as the glass plate 210. The body 21 is rectangular and includes a first face (lower face in FIG. 1) and a second face (upper face in FIG. 1) in a thickness direction which are parallel to each other. Each of the first face and the second face of the body 21 is a flat face.

The coating 22 is formed on the first face of the body 21. The coating 22 is part of the coating 220 of the first glass substrate 200 corresponding to the evacuated space 50. The coating 22 has the same physical properties as the coating 220.

The second glass panel 30 is part of the second glass substrate 300 corresponding to the evacuated space 50. The outlet 700 for forming the evacuated space 50 is present in the part 320 of the second glass substrate 300 corresponding to the second space 520, and the evacuation pipe 810 is connected to the part 320. Therefore, the evacuation pipe 810 is not connected to the second glass panel 30 and also the outlet 700 is not present in the second glass panel 30.

The second glass panel 30 includes a body 31 determining a plan shape of the second glass panel 30. The body 31 is part of the glass plate 310 of the second glass substrate 300 corresponding to the evacuated space 50. Thus, the body 31 is of the same material as the glass plate 310.

The body 31 is rectangular and includes a first face (upper face in FIG. 1) and a second face (lower face in FIG. 1) in a thickness direction which are parallel to each other. Each of the first face and the second face of the body 31 is a flat face. The body 31 has the same plan shape as the body 21 (in other words, the second glass panel 30 has the same plan shape as the first glass panel 20).

The second glass panel 30 includes the body 31 only. In other words, the body 31 forms the second glass panel 30 by itself.

The first glass panel 20 and the second glass panel 30 are arranged so that the first face of the body 21 and the first face of the body 31 face and parallel to each other. In other words, the second face of the body 21 is directed outward from the glass panel unit 10, and the first face of the body 21 is directed inward of the glass panel unit 10. Further, the first face of the body 31 is directed inward of the glass panel unit 10, and the second face of the body 31 is directed outward from the glass panel unit 10.

[1-2. Method for Manufacturing]

Hereinafter, a method for manufacturing the glass panel unit 10 of the present embodiment is described with reference to FIG. 6 to FIG. 11.

The method for manufacturing the glass panel unit 10 of the present embodiment includes a preparation step, an assembling step, a hermetically enclosing step, and a removing step. Note that, the preparation step can be omitted.

The preparation step is a step of forming the first glass substrate 200, the second glass substrate 300, the frame 410, the partition 420, the inside space 500, the gas passage 600, the outlet 700, the gas adsorbent 60, and the multiple spacers 70, for the purpose of producing the temporary assembly 100. The preparation step includes first to sixth steps. Note that, the order of the second to fifth steps may be modified.

The first step is a step (substrate formation step) of forming the first glass substrate 200 and the second glass substrate 300. For example, in the first step, the first glass substrate 200 and the second glass substrate 300 are produced. The first step may include cleaning the first glass substrate 200 and the second glass substrate 300 if necessary.

The second step is a step of forming the outlet 700. In the second step, the outlet 700 is formed in the second glass substrate 300. Further, in the second step, the second glass substrate 300 is cleaned if necessary.

The third step is a step (sealing material formation step) of forming the frame 410 and the partition 420. In the third step, the material (the first thermal adhesive) of the frame 410 and the material (the second thermal adhesive) of the partition 420 are applied on to the second glass substrate 300 (the first face of the glass plate 310) with a dispenser or the like. Thereafter, the material of the frame 410 and the material of the partition 420 are dried and calcined. For example, the second glass substrate 300 where the material of the frame 410 and the material of the partition 420 are applied is heated at 480° C. for 20 minutes. Note that, in the third step, the material of the frame 410 and the material of the partition 420 may not be calcined but may be dried only. Note that, the first glass substrate 200 may be heated together with the second glass substrate 300. In other words, the first glass substrate 200 may be heated under the same condition (at 480° C. for 20 minutes) as the second glass substrate 300. By doing so, it is possible to reduce a difference in degree of warp between the first glass substrate 200 and the second glass substrate 300.

The fourth step is a step (spacer formation step) of forming the spacers 70. The fourth step may include placing the multiple spacers 70 in individual predetermined locations on the second glass substrate 300 with a chip mounter. Note that, the multiple spacers 70 are formed in advance. Alternatively, the multiple spacers 70 may be formed by use of photolithography techniques and etching techniques. In this case, the multiple spacers 70 may be made of photo-curable material or the like. Alternatively, the multiple spacers 70 may be formed by use of known thin film formation techniques.

The fifth step is a step (gas adsorbent formation step) of forming the gas adsorbent 60. In the fifth step, a solution where a power of the getter is dispersed is applied to a predetermined location on the second glass substrate 300 and then dried to thereby form the gas adsorbent 60.

Figure 6:
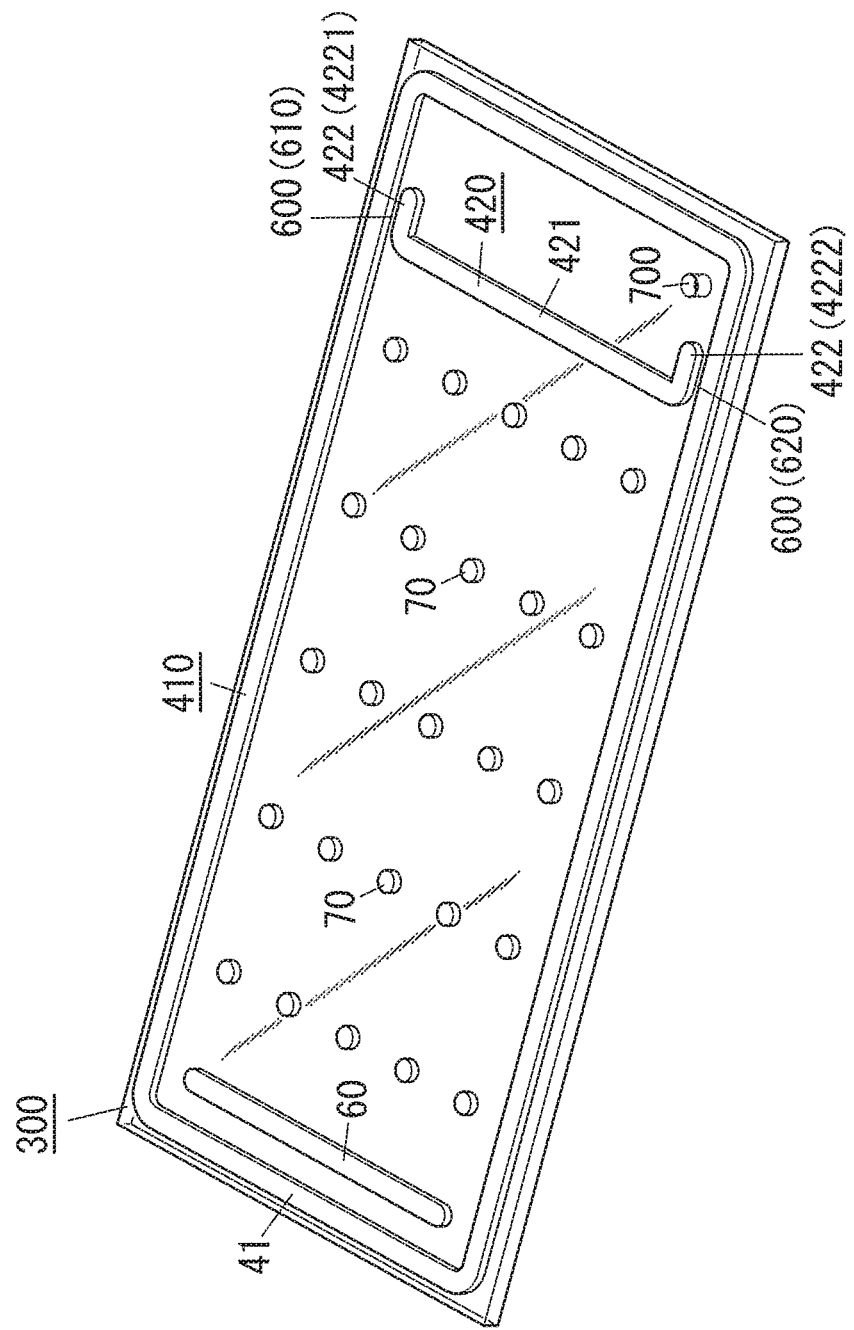
FIG. 6 is an explanatory view of the method for manufacturing the glass panel unit of the embodiment.
Figure 7:
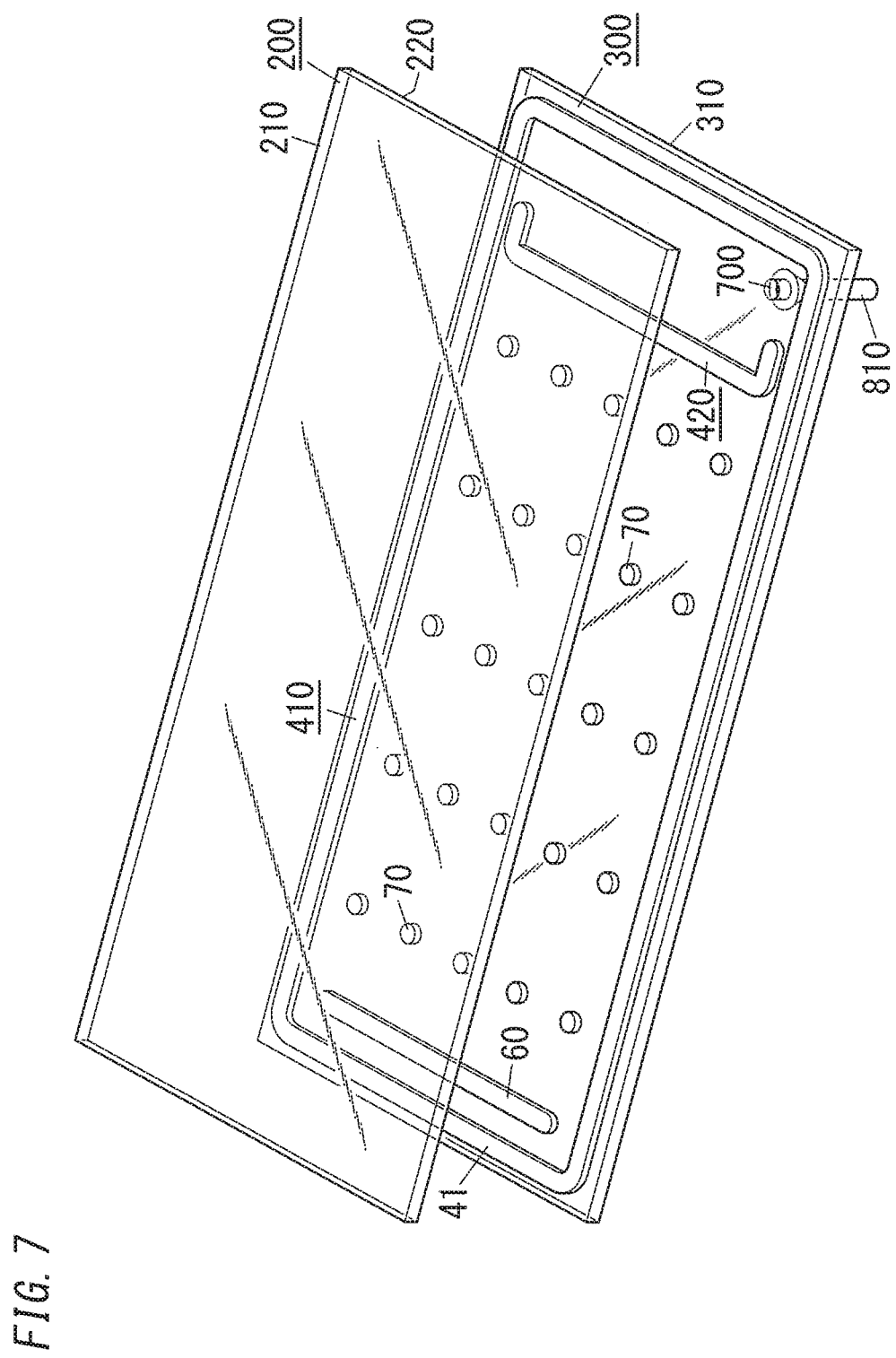
FIG. 7 is another explanatory view of the method for manufacturing the glass panel unit of the embodiment.

When a process from the first step to the fifth step is completed, the second glass substrate 300 is obtained, on which the frame 410, the partition 420, the gas passage 600, the outlet 700, the gas adsorbent 60, and the multiple spacers 70 are formed as shown in FIG. 6.

The sixth step is a step (placing step) of placing the first glass substrate 200 and the second glass substrate 300. In the sixth step, the first glass substrate 200 and the second glass substrate 300 are placed so that the first face of the glass plate 210 and the first face of the glass plate 310 face and are parallel to each other.

The assembling step is a step of preparing the temporary assembly 100. In more detail, in the assembling step, the temporary assembly 100 is prepared by bonding the first glass substrate 200 and the second glass substrate 300 to each other. In other words, the assembling step may be referred to as a step (first melting step) of hermetically bonding the first glass substrate 200 and the second glass substrate 300 to each other with the frame 410.

In the first melting step, the first thermal adhesive is melted once at the predetermined temperature (the first melting temperature) Tm1 equal to or higher than the first softening point and thereby the first glass substrate 200 and the second glass substrate 300 are hermetically bonded to each other. In more detail, the first glass substrate 200 and the second glass substrate 300 are placed in a furnace and heated at the first melting temperature Tm1 only for predetermined time (the first melting time) tm1 (see FIG. 9).

The first melting temperature Tm1 and the first melting time tm1 are selected so that the first glass substrate 200 and the second glass substrate 300 are hermetically bonded to each other with the first thermal adhesive of the frame 410 but the gas passage 600 is not closed by the partition 420. In other words, a lower limit of the first melting temperature Tm1 is equal to the first softening point, and an upper limit of the first melting temperature Tm1 is however selected so as not to cause the partition 420 to close the gas passage 600. For example, when the first softening point and the second softening point are 434° C., the first melting temperature Tm1 is set to 440° C. Further, the first melting time tm1 may be 10 minutes, for example. Note that, in the first melting step, the frame 410 may emit gas. However such gas can be adsorbed by the gas adsorbent 60. Note that, in the first melting step, the material of the frame 410 and the material of the partition 420 are heated. Therefore, when calcination of the material of the frame 410 and the material of the partition 420 is not performed in the third step, such calcination is performed in the first melting step (that is, the first melting step plays a role of a step of calcination). When the calcination is omitted in the third step as described above, the number of steps in the method for manufacturing glass panel unit can be reduced, and there is no need to pay cost for calcination (utility cost), and thus production cost can be reduced. When calcination is not performed in the third step, an amount of gas emitted from the frame 410 and/or the like in the first melting step may increase compared with a case where the calcination is performed in the third step. However, such a problem of an increase in an amount of gas can be solved by improving the adsorbability of the gas adsorbent 60 (for example, increasing an amount of the getter of the gas adsorbent 60).

Figure 8:
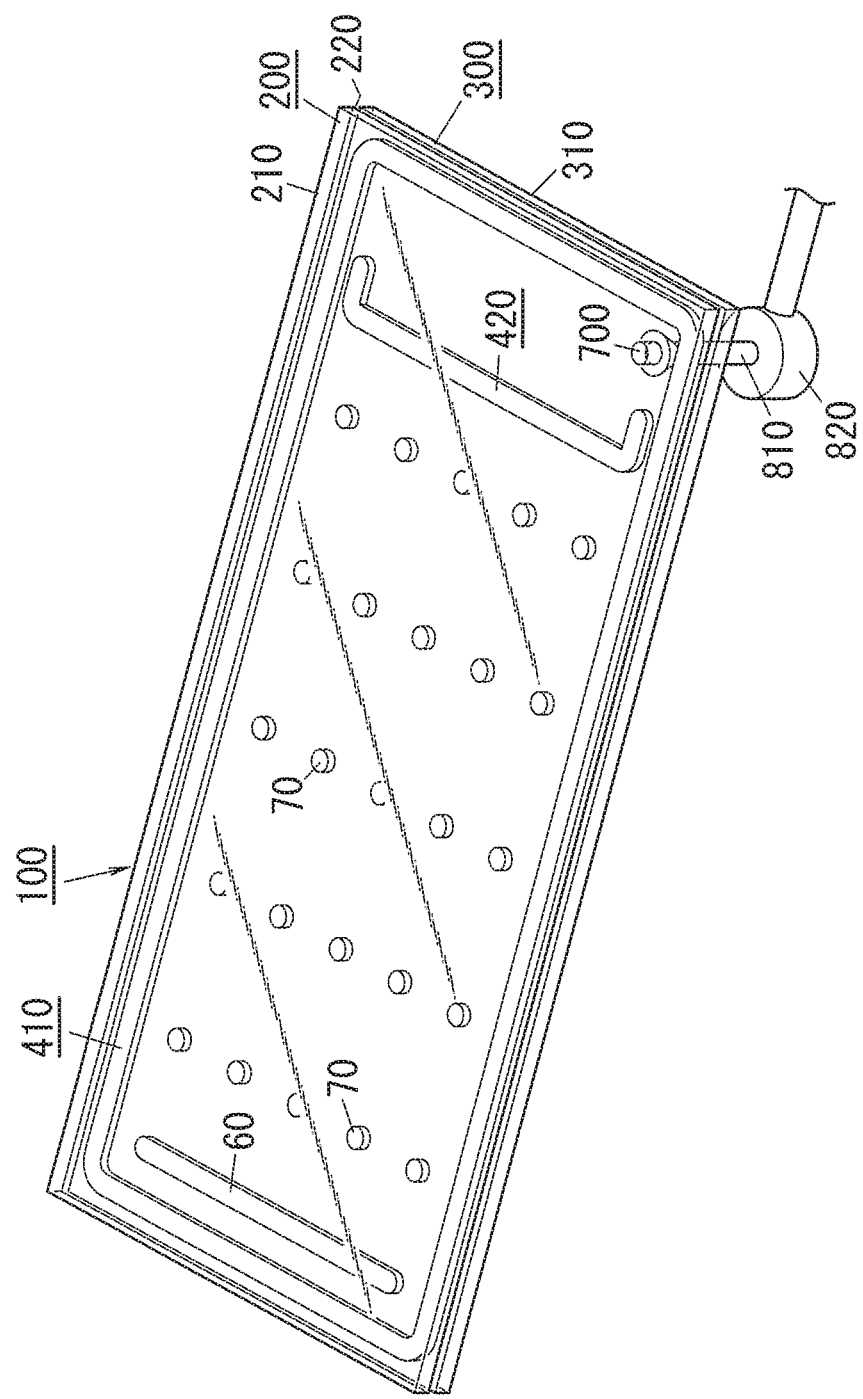
FIG. 8 is another explanatory view of the method for manufacturing the glass panel unit of the embodiment.

Through the aforementioned assembling step (the first melting step), the temporary assembly 100 shown in FIG. 8 can be produced.

The hermetically enclosing step is a step of subjecting the temporary assembly 100 to the above predetermined process to obtain the completed assembly 110. The hermetically enclosing step includes the evacuating step and a melting step (the second melting step). In other words, the evacuating step and the second melting step constitute the above predetermined process.

The evacuating step is a step of converting the first space 510 into the evacuated space 50 by evacuating it by way of the gas passage 600, the second space 520, and the outlet 700 at the predetermined temperature (the evacuation temperature) Te.

Evacuation can be done by a vacuum pump, for example. As shown in FIG. 8, the vacuum pump is connected to the temporary assembly 100 with the evacuation pipe 810 and a sealing head 820. The evacuation pipe 810 is bonded to the second glass substrate 300 so that an inside of the evacuation pipe 810 is connected to the outlet 700, for example. The sealing head 820 is attached to the evacuation pipe 810, and thereby an inlet of the vacuum pump is connected to the outlet 700.

The first melting step, the evacuating step, and the second melting step are performed with the first glass substrate 200 and the second glass substrate 300 (the second glass substrate 300 where the frame 410, the partition 420, the gas passage 600, the outlet 700, the gas adsorbent 60, and the multiple spacers 70 are formed) being left in the furnace. Therefore, the evacuation pipe 810 is bonded to the second glass substrate 300 before the first melting step at the latest.

Figure 9:
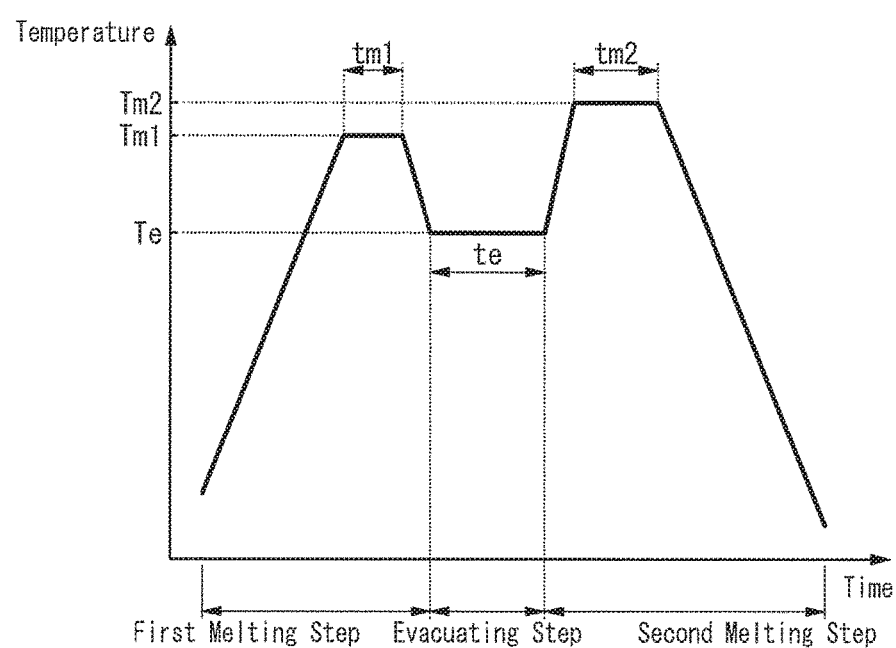
FIG. 9 is another explanatory view of the method for manufacturing the glass panel unit of the embodiment.

In the evacuating step, the first space 510 is evacuated by way of the gas passage 600, the second space 520, and the outlet 700 at the evacuation temperature Te only for predetermined time (evacuation time) te (see FIG. 9).

The evacuation temperature Te is set to be higher than the activation temperature (for example, 350° C.) of the getter of the gas adsorbent 60, and also is set to be lower than the first softening point and the second softening point (for example, 434° C.). For example, the evacuation temperature Te is 390° C.

According to the above settings, deformation of the frame 410 and the partition 420 is unlikely to occur. Further, the getter of the gas adsorbent 60 is activated, and thus molecules (gas) adsorbed on the getter are desorbed from the getter. Such molecules (that is, gas) desorbed from the getter are discarded through the first space 510, the gas passage 600, the second space 520, and the outlet 700. Therefore, in the evacuating step, the adsorbability of the gas adsorbent 60 is recovered.

The evacuation time te is set to obtain the evacuated space 50 having a desired degree of vacuum (for example, a degree of vacuum equal to or lower than 0.1 Pa). For example, the evacuation time te is set to 120 minutes.

The second melting step is a step of forming the seal 40 enclosing the evacuated space 50 by changing the shape of the partition 420 to form the separator 42 closing the gas passage 600. In the second melting step, the second thermal adhesive is melted once at the predetermined temperature (the second melting temperature) Tm2 equal to or higher than the second softening point, and thereby the partition 420 is changed in shape to form the separator 42. In more detail, the first glass substrate 200 and the second glass substrate 300 are heated at the second melting temperature Tm2 for the predetermined time (the second melting time) tm2 in the furnace (see FIG. 9).

The second melting temperature Tm2 and the second melting time tm2 are set to allow the second thermal adhesive to soften to form the separator 42 closing the gas passage 600. A lower limit of the second melting temperature Tm2 is equal to the second softening point (434° C.). Note that, differently from the first melting step, the purpose of the second melting step is to change the shape of the partition 420, and consequently the second melting temperature Tm2 is set to be higher than the first melting temperature (440° C.) Tm1. For example, the second melting temperature Tm2 is set to 460° C. Additionally, the second melting time tm2 is, for example, 30 minutes.

When the separator 42 is formed, the evacuated space 50 is separated from the second space 520. Hence, the vacuum pump cannot evacuate the evacuated space 50. The frame 410 and the separator 42 are heated until the second melting step is finished, and therefore gas may be emitted from the frame 410 and the separator 42. However, gas emitted from the frame 410 and the separator 42 is adsorbed on the gas adsorbent 60 inside the evacuated space 50. Consequently, a decrease in the degree of vacuum of the evacuated space 50 can be suppressed. In summary, it is possible to suppress a decrease in the thermal insulating properties of the glass panel unit 10.

Also in the first melting step, the frame 410 and the separator 42 are heated. Thus, the frame 410 and the separator 42 may emit gas. Gas emitted by the frame 410 and the separator 42 is adsorbed by the gas adsorbent 60, and therefore the adsorbability of the gas adsorbent 60 may decrease due to the first melting step. However, in the evacuating step, the first space 510 is evacuated at the evacuation temperature Te equal to or higher than the activation temperature of the getter of the gas adsorbent 60 and thereby the adsorbability of the gas adsorbent 60 is recovered. Therefore, the gas adsorbent 60 can adsorb a sufficient amount of gas emitted from the frame 410 and the separator 42 in the second melting step. In other words, it is possible to avoid an undesired situation the gas adsorbent 60 fails to adsorb a sufficient amount of gas emitted from the frame 410 and the separator 42 and thus the degree of vacuum of the evacuated space 50 decreases.

Additionally, in the second melting step, evacuation of the first space 510 through the gas passage 600, the second space 520, and the outlet 700 is continued from the evacuating step. In other words, in the second melting step, the separator 42 closing the gas passage 600 is formed by changing the shape of the partition 420 at the second melting temperature Tm2 while the first space 510 is evacuated through the gas passage 600, the second space 520, and the outlet 700. By doing so, it is possible to more lower a probability that the degree of vacuum of the evacuated space 50 decreases during the second melting step. Note that, the second melting step does not necessarily include evacuating the first space 510 through the gas passage 600, the second space 520, and the outlet 700.

Figure 10:
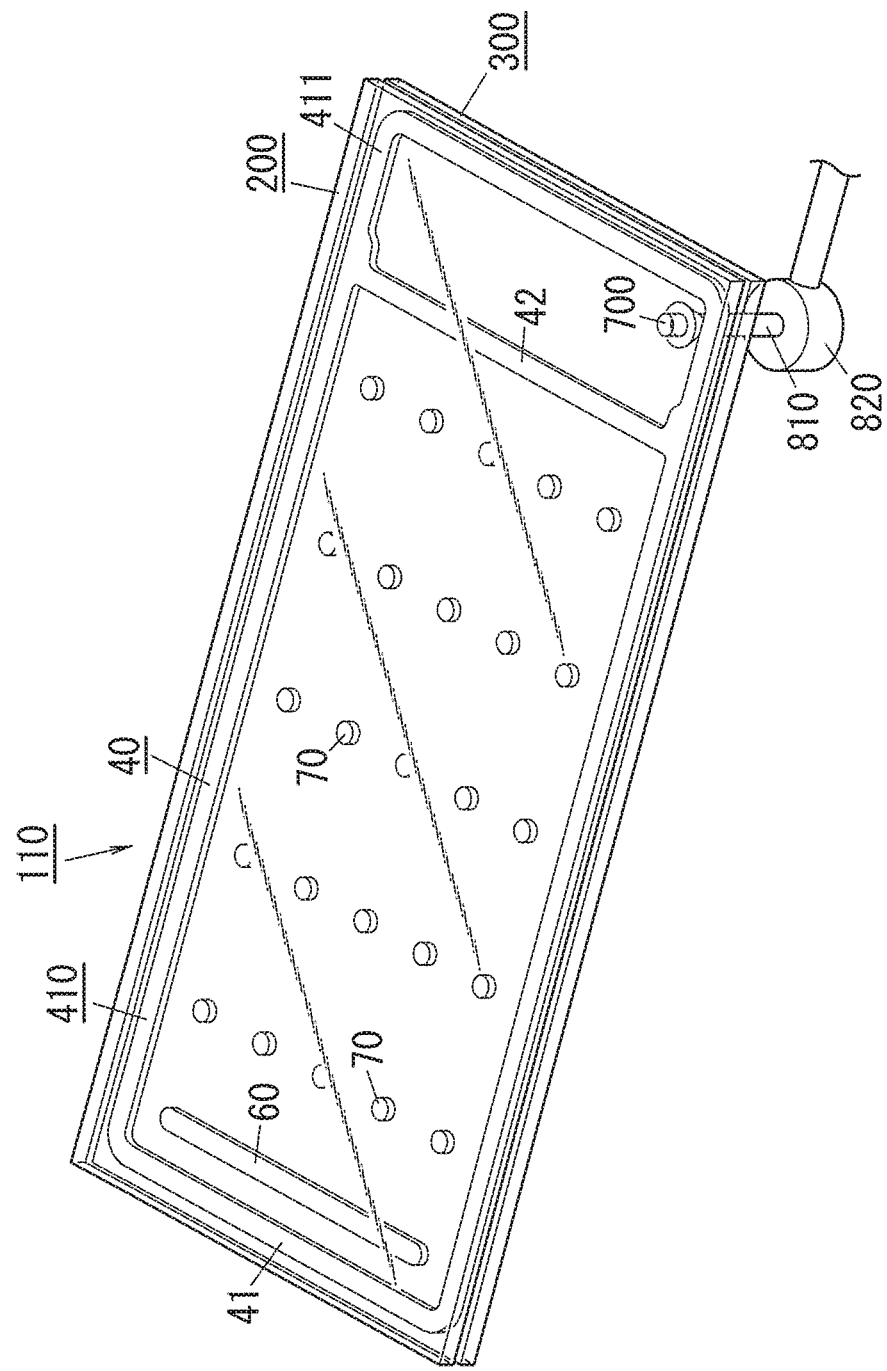
FIG. 10 is another explanatory view of the method for manufacturing the glass panel unit of the embodiment.

Through the aforementioned hermetically enclosing step, the completed assembly 110 shown in FIG. 10 is produced.

The removing step is a step of obtaining the glass panel unit 10 which is part including the evacuated space 50, by removing part 11 including the second space 520 from the completed assembly 110. In more detail, the completed assembly 110 taken out from the furnace is cut along the cutting line 900 shown in FIG. 5, and thereby is divided into predetermined part (glass panel unit) 10 including the evacuated space 50 and part (unnecessary part) 11 including the second space 520. Note that, the shape of the cutting line 900 is set according to the shape of the glass panel unit 10. The glass panel unit 10 is rectangular, and therefore the cutting line 900 is a straight line along the lengthwise direction of the separator 42.

Through the aforementioned preparation step, assembling step, hermetically enclosing step, and removing step, the glass panel unit 10 is produced.

[1-3. Features]

The glass panel unit 10 of the present embodiment as described above is the predetermined part separated from the completed assembly 110 obtained by subjecting the temporary assembly 100 to the predetermined process. The temporary assembly 100 includes the first glass substrate 200, the second glass substrate 300, the frame 410, the inside space 500, the partition 420, the gas passage 600, the outlet 700, and the gas adsorbent 60. The second glass substrate 300 is placed opposite the first glass substrate 200. The frame 410 is placed between the first glass substrate 200 and the second glass substrate 300 to hermetically bond the first glass substrate 200 and the second glass substrate 300 to each other. The inside space 500 is a space enclosed by the first glass substrate 200, the second glass substrate 300, and the frame 410. The partition 420 divides the inside space 500 into the first space 510 and the second space 520. The gas passage 600 is formed inside the inside space 500 to interconnect the first space 510 and the second space 520. The outlet 700 interconnects the second space 520 and the outside space. The gas adsorbent 60 is placed in the first space 510 and includes the getter. The predetermined process includes converting the first space 510 into the evacuated space 50 by evacuating the first space 510 through the gas passage 600, the second space 520, and the outlet 700. The predetermined process includes changing the shape of the partition 420 to close the gas passage 600 to form the separator 42 separating the evacuated space 50 from the second space 520 so that part of the frame 410 corresponding to the evacuated space 50 and the separator 42 constitute the seal 40. The seal 40 hermetically bonds the first glass substrate 200 and the second glass substrate 300 so as to enclose the evacuated space 50. The predetermined part (glass panel unit) 10 includes: the first glass panel 20 which is part of the first glass substrate 200 that corresponds to the evacuated space 50; the second glass panel 30 which is part of the second glass substrate 300 that corresponds to the evacuated space 50; the seal 40; the evacuated space 50; and the gas adsorbent 60.

Additionally, the getter is an evaporative getter. In particular, the getter is zeolite, or ion-exchanged zeolite.

Additionally, the gas adsorbent 60 includes a powder of the getter. The gas adsorbent 60 is placed on an end of the evacuated space 50.

Additionally, the getter has the activation temperature lower than a temperature (the evacuation temperature) Te in evacuating the first space 510 through the gas passage 600, the second space 520, and the outlet 700.

Additionally, the frame 410 includes the first thermal adhesive having the first softening point. The partition 420 includes the second thermal adhesive having the second softening point equal to or higher than the first softening point. The first glass substrate 200 and the second glass substrate 300 are hermetically bonded to each other by temporarily melting the first thermal adhesive at the first melting temperature Tm1 equal to or higher than the first softening point. The partition 420 is changed in shape by temporarily melting the second thermal adhesive at the second melting temperature Tm2 equal to or higher than the second softening point.

Additionally, the first melting temperature Tm1 is lower than the second melting temperature Tm2.

Additionally, the getter has the activation temperature lower than a temperature (the evacuation temperature) Te in evacuating the first space 510 through the gas passage 600, the second space 520, and the outlet 700. The first softening point and the second softening point are higher than the temperature Te in evacuating the first space 510 through the gas passage 600, the second space 520, and the outlet 700.

The temporary assembly 100 for producing the glass panel unit 10 of the present embodiment includes the first glass substrate 200, the second glass substrate 300, the frame 410, the inside space 500, the partition 420, the gas passage 600, the outlet 700, and the gas adsorbent 60. The second glass substrate 300 is placed opposite the first glass substrate 200. The frame 410 is placed between the first glass substrate 200 and the second glass substrate 300 to hermetically bond the first glass substrate 200 and the second glass substrate 300 to each other. The inside space 500 is a space enclosed by the first glass substrate 200, the second glass substrate 300, and the frame 410. The partition 420 divides the inside space 500 into the first space 510 and the second space 520. The gas passage 600 is formed inside the inside space 500 to interconnect the first space 510 and the second space 520. The outlet 700 interconnects the second space 520 and the outside space. The gas adsorbent 60 is placed in the first space 510 and includes the getter.

The completed assembly 110 for producing the glass panel unit 10 of the present embodiment includes the first glass substrate 200, the second glass substrate 300, the frame 410, the inside space 500, the separator 42, the outlet 700, and the gas adsorbent 60. The second glass substrate 300 is placed opposite the first glass substrate 200. The frame 410 is placed between the first glass substrate 200 and the second glass substrate 300 to hermetically bond the first glass substrate 200 and the second glass substrate 300 to each other. The inside space 500 is a space enclosed by the first glass substrate 200, the second glass substrate 300, and the frame 410. The separator 42 divides the inside space 500 into the evacuated space 50 and the second space 520. The outlet 700 interconnects the second space 520 and the outside space. The gas adsorbent 60 includes the getter and is placed in the first space 510. The separator 42 is formed by changing the shape of the partition 420 dividing the inside space 500 into the first space 510 and the second space 520, subsequent to evacuating the first space 510 through the gas passage 600 interconnecting the first space 510 and the second space 520 in the inside space 500, the second space 520, and the outlet 700, to convert the first space 510 into the evacuated space 50, so as to close the gas passage 600.

The method for manufacturing the aforementioned glass panel unit 10 includes the assembling step, the hermetically enclosing step, and the removing step. The assembling step is of preparing the temporary assembly 100. The temporary assembly 100 includes the first glass substrate 200, the second glass substrate 300, the frame 410, the inside space 500, the partition 420, the gas passage 600, the outlet 700, and the gas adsorbent 60. The second glass substrate 300 is placed opposite the first glass substrate 200. The frame 410 is placed between the first glass substrate 200 and the second glass substrate 300 to hermetically bond the first glass substrate 200 and the second glass substrate 300 to each other. The inside space 500 is a space enclosed by the first glass substrate 200, the second glass substrate 300, and the frame 410. The partition 420 divides the inside space 500 into the first space 510 and the second space 520. The gas passage 600 is formed inside the inside space 500 to interconnect the first space 510 and the second space 520. The outlet 700 interconnects the second space 520 and the outside space. The gas adsorbent 60 is placed in the first space 510 and includes the getter. The hermetically enclosing step is of obtaining the completed assembly 110 by: converting the first space 510 into the evacuated space 50 by evacuating the first space 510 through the gas passage 600, the second space 520, and the outlet 700 and changing the shape of the partition 420 to close the gas passage 600 to form the separator 42 so that part of the frame 410 corresponding to the evacuated space 50 and the separator 42 constitute the seal 40 hermetically bonding the first glass substrate 200 and the second glass substrate 300 so as to enclose the evacuated space 50. The removing step is of removing the part 11 including the second space 520 from the completed assembly 110 to obtain the glass panel unit 10 which is the predetermined part including the evacuated space 50.

Additionally, the frame 410 includes the first thermal adhesive having the first softening point. The partition 420 includes the second thermal adhesive having the second softening point equal to or higher than the first softening point. In the assembling step, the first glass substrate 200 and the second glass substrate 300 are hermetically bonded to each other by temporarily melting the first thermal adhesive at the first melting temperature Tm1 equal to or higher than the first softening point. In the hermetically enclosing step, the separator 42 is formed by changing the shape of the partition 420 by temporarily melting the second thermal adhesive at the second melting temperature Tm2 equal to or higher than the second softening point. The first melting temperature Tm1 is lower than the second melting temperature Tm2.

Further, in the hermetically enclosing step, the first space 510 is evacuated through the gas passage 600, the second space 520, and the outlet 700 at the evacuation temperature Te. The evacuation temperature Te is higher than the activation temperature of the getter.

Additionally, the evacuation temperature Te is lower than the first melting temperature Tm1 and the second melting temperature Tm2.

Additionally, in the hermetically enclosing step, the separator 42 is formed by changing the shape of the partition 420 while evacuating the first space 510 through the gas passage 600, the second space 520, and the outlet 700.

2. Modifications

In the above embodiment, the glass panel unit (10) is rectangular, but the glass panel unit (10) may have a desired shape such as a circular shape and a polygonal shape. Stated differently, each of the first glass panel (20), the second glass panel (30), and the seal (40) may not be rectangular and may have a desired shape such as a circular shape and a polygonal shape. Note that, the shapes of the first glass substrate (200), the second glass substrate (300), the frame (410), and, the separator (42) may not be limited to the shapes described in the explanation of the above embodiment, and may have such shapes that the glass panel unit (10) can have a desired shape. Note that, the shape and size of the glass panel unit (10) may be determined in consideration of application of the glass panel unit (10).

Additionally, the first face and the second face, of the body (21) of the first glass panel (20) may not be limited to flat faces. Similarly, the first face and the second face, of the body (31) of the second glass panel (30) may not be limited to flat faces.

Additionally, the body (21) of the first glass panel (20) and the body (31) of the second glass panel (30) may not have the same plan shape and plan size. Further, the body (21) and the body (31) may not have the same thickness. Furthermore, the body (21) and the body (31) may not be made of the same material. Similarly, the glass plate (210) of the first glass substrate (200) and the glass plate (310) of the second glass substrate (300) may not have the same plan shape and plan size. Further, the glass plate (210) and the glass plate (310) may not have the same thickness. Furthermore, the glass plate (210) and the glass plate (310) may not be made of the same material.

Additionally, the seal (40) may not have the same plan shape with the first glass panel (20) and the second glass panel (30). Similarly, the frame (410) may not have the same plan shape with the first glass substrate (200) and the second glass substrate (300).

Additionally, the first glass panel (20) may include a coating which has desired physical properties and is formed on the second face of the body (21). Alternatively, the first glass panel (20) may not include the coating (22). In other words, the first glass panel (20) may be constituted by the body (21) only.

Additionally, the second glass panel (30) may include a coating with desired physical properties. For example, the coating may include at least one of thin films formed on the first face and the second face of the body (31) respectively. Examples of the coating may include a film reflective for light with a specified wavelength (for example, infrared reflective film and ultraviolet reflective film).

In the above embodiment, the frame (410) is made of the first thermal adhesive. However, the frame (410) may include other component such as a core, in addition to the first thermal adhesive. Stated differently, it is sufficient that the frame (410) includes the first thermal adhesive. In the above embodiment, the frame (410) is formed to surround an almost entire region on the second glass substrate (300). However, it is sufficient that the frame (410) is formed to surround a predetermined region on the second glass substrate (300). In other words, there is no need to form the frame (410) so as to surround an almost entire region on the second glass substrate (300). Alternatively, the completed assembly (110) may include two or more frames (410). In other words, the completed assembly (110) may include two or more inside spaces (500). In this case, it is possible to produce two or more glass panel units (10) from one completed assembly (110).

In the above embodiment, the partition (420) is made of the second thermal adhesive. However, the partition (420) may include other component such as a core, in addition to the second thermal adhesive. Stated differently, it is sufficient that the partition (420) includes the second thermal adhesive. Further, in the above embodiment, the partition (420) has its opposite end not connected to the frame (410). And, gaps between the opposite ends of the partition (420) and the frame (410) define the gas passages (610, 620). However, the partition (420) may have only one of its opposite ends not connected to the frame (410). In this case, there is one gas passage (600) between the partition (420) and the frame (410). Alternatively, the partition (420) may have its opposite end both connected to the frame (410). In this case, the gas passage (600) may be a through hole formed in the partition (420). Alternatively, the gas passage (600) may be a gap between the partition (420) and the first glass substrate (200). Alternatively, the partition (420) may be defined as a set of two or more partitions spaced from each other. In this case, the gas passage (600) may be a gap between adjacent two of the two or more partitions.

In the above embodiment, the inside space (500) is divided into one first space (510) and one second space (520). Note that, the inside space (500) may be divided into one or more first spaces (510) and one or more second spaces (520). When the inside space (500) includes two or more first spaces (510), it is possible to produce two or more glass panel units (10) from one completed assembly (110).

In the above embodiment, the second thermal adhesive is identical to the first thermal adhesive, and the second softening point is equal to the first softening point. However, the second thermal adhesive may be different material from the first thermal adhesive. For example, the second thermal adhesive may have the second softening point different from the first softening point of the first thermal adhesive. In such a case, the second softening point may be preferably higher than the first softening point. In this case, the first melting temperature Tm1 can be set to be equal to or higher than the first softening point and lower than the second softening point. By doing so, it is possible to suppress undesired deformation of the partition 420 in the first melting step.

Additionally, each of the first thermal adhesive and the second thermal adhesive may not be limited to glass frit, but may be selected from low-melting-point metal, hot-melt adhesive, and the like, for example.

In the above embodiment, a furnace is used to heat the frame (410), the gas adsorbent (60), and the partition (420). However, such heating can be done with appropriate heating means. Examples of the heating means may include a laser and a thermally conductive plate connected to a heat source.

In the above embodiment, the gas passage (600) includes the two gas passages (610, 620). However, the gas passage (600) may include only one gas passage or may include three or more gas passages. Further, the shape of the gas passage (600) may not be limited in particular.

In the above embodiment, the outlet (700) is formed in the second glass substrate (300). However, the outlet (700) may be formed in the glass plate (210) of the first glass substrate (200) or may be formed in the frame (410). In summary, the outlet (700) may be allowed to be formed in the unnecessary part (11).

In the above embodiment, the getter of the gas adsorbent (60) is an evaporative getter. However, the getter may be a non-evaporative getter. When the non-evaporative getter has a temperature equal to or higher than a predetermined temperature (the activation temperature), adsorbed molecules intrudes into an inside of the getter, and thus the adsorbability can be recovered. In contrast to the evaporative getter, the adsorbed molecules are not desorbed. Therefore, after the non-evaporative getter has adsorbed an amount of molecules equal to or more than a certain amount, the adsorbability is no longer recovered even if the getter is heated up to a temperature equal to or higher than the activation temperature.

In the above embodiment, the gas adsorbent (60) has an elongated flat plate shape, but may have another shape. Additionally, the gas adsorbent (60) may not be necessarily positioned at the end of the evacuated space (50). Further, in the above embodiment, the gas adsorbent (60) may be formed by applying a liquid containing a powder of the getter (for example, a dispersion liquid prepared by dispersing a powder of the getter in a liquid, and a solution prepared by dissolving a powder of the getter in a liquid). However, the gas adsorbent (60) may include a substrate and the getter fixed to the substrate. This type of the gas adsorbent (60) may be formed by immersing a substrate in a liquid containing the getter and drying it. Note that, the substrate may have a desired shape, but may be an elongated rectangular shape, for example.

Alternatively, the gas adsorbent (60) may be a film formed entirely or partially on the surface (first face) of the glass plate (310) of the second glass substrate (300). This type of the gas adsorbent (60) may be formed by coating the surface (first face) of the glass plate (310) of the second glass substrate (300) with a liquid containing a powder of the getter.

Alternatively, the gas adsorbent (60) may be included in the spacer (70). For example, the spacer (70) may be made of material containing the getter, and thereby the spacer (70) including the gas adsorbent (60) can be obtained.

Alternatively, the gas adsorbent (60) may be solid material made of the getter. This gas adsorbent (60) tends to have a large size, and thus cannot be placed between the first glass substrate (200) and the second glass substrate (300) in some cases. In such cases, the glass plate (310) of the second glass substrate (300) may be formed to include a recess, and the gas adsorbent (60) may be placed in such recess.

In the above embodiment, the glass panel unit (10) includes the multiple spacers (70). However, the glass panel unit (10) may include a single spacer (70). Alternatively, the glass panel unit (10) may not include any spacer (70).

3. Aspects According to Present Invention

As obviously derived from the aforementioned present embodiment and modifications, the glass panel unit (10) of the first aspect according to the present invention is a predetermined part (10) separated from a completed assembly (110) obtained by subjecting a temporary assembly (100) to a predetermined process. The temporary assembly (100) includes: a first glass substrate (200); a second glass substrate (300) placed opposite the first glass substrate (200); a frame (410) placed between the first glass substrate (200) and the second glass substrate (300) to hermetically bond the first glass substrate (200) and the second glass substrate (300) to each other; an inside space (500) enclosed by the first glass substrate (200), the second glass substrate (300), and the frame (410); a partition (420) dividing the inside space (500) into a first space (510) and a second space (520); a gas passage (600) formed inside the inside space (500) to interconnect the first space (510) and the second space (520); an outlet (700) interconnecting the second space (520) and an outside space; and a gas adsorbent (60) placed in the first space (510) and including a getter. The predetermined process includes: converting the first space (510) into an evacuated space (50) by evacuating the first space (510) through the gas passage (600), the second space (520), and the outlet (700); and changing a shape of the partition (420) to close the gas passage (600) to form a separator (42) separating the evacuated space (50) from the second space (520) so that part of the frame (410) corresponding to the evacuated space (50) and the separator (42) constitute a seal (40) hermetically bonding the first glass substrate (200) and the second glass substrate (300) so as to enclose the evacuated space (50). The predetermined part (10) includes: a first glass panel (20) which is part of the first glass substrate (200) that corresponds to the evacuated space (50); a second glass panel (30) which is part of the second glass substrate (300) that corresponds to the evacuated space (50); the seal (40); the evacuated space (50); and the gas adsorbent (60).

According to the first aspect, it is possible to obtain the glass panel unit (10) which does not have the outlet (700) and an evacuation pipe (810) but has improved thermal insulating properties.

The glass panel unit (10) of the second aspect according to the present invention would be realized in combination with the first aspect. In the second aspect, the getter is an evaporative-getter.

According to the second aspect, it is possible to recover the adsorbability of the gas adsorbent (60).

The glass panel unit (10) of the third aspect according to the present invention would be realized in combination with the second aspect. In the third aspect, the getter is zeolite, or ion-exchanged zeolite.

According to the third aspect, it is possible to increase the inherent adsorbability of the gas adsorbent (60).

The glass panel unit (10) of the fourth aspect according to the present invention would be realized in combination with the first aspect. In the fourth aspect, the getter is a non-evaporative getter.

According to the fourth aspect, it is possible to recover the adsorbability of the gas adsorbent (60).

The glass panel unit (10) of the fifth aspect according to the present invention would be realized in combination with any one of the first to fourth aspects. In the fifth aspect, the gas adsorbent (60) includes a powder of the getter.

According to the fifth aspect, it is possible to downsize the gas adsorbent (60). Therefore, the gas adsorbent (60) can be placed even if the evacuated space (50) is small.

The glass panel unit (10) of the sixth aspect according to the present invention would be realized in combination with any one of the first to fifth aspects. In the sixth aspect, the gas adsorbent (60) is placed on an end of the evacuated space (50).

According to the sixth aspect, the gas adsorbent (60) is unlikely to be perceived.

The glass panel unit (10) of the seventh aspect according to the present invention would be realized in combination with any one of the first to sixth aspects. In the seventh aspect, the getter has an activation temperature lower than a temperature (evacuation temperature) Te in evacuating the first space (510) through the gas passage (600), the second space (520), and the outlet (700).

According to the seventh aspect, it is possible to recover the adsorbability of the gas adsorbent (60) in evacuating the first space (510) through the gas passage (600), the second space (520), and the outlet (700).

The glass panel unit (10) of the eighth aspect according to the present invention would be realized in combination with any one of the first to sixth aspects. In the eighth aspect, the frame (410) includes a first thermal adhesive having a first softening point. The partition (420) includes a second thermal adhesive having a second softening point equal to or higher than the first softening point. The first glass substrate (200) and the second glass substrate (300) are hermetically bonded to each other by temporarily melting the first thermal adhesive at a first melting temperature (Tm1) equal to or higher than the first softening point. The partition (420) is changed in shape by temporarily melting the second thermal adhesive at a second melting temperature (Tm2) equal to or higher than the second softening point. The first melting temperature (Tm1) is lower than the second melting temperature (Tm2).

According to the eighth aspect, it is possible to lower a probability that the gas passage (600) is closed as a result of change in the shape of the partition (420) in hermetically bonding the first glass substrate (200) and the second glass substrate (300).

The glass panel unit (10) of the ninth aspect according to the present invention would be realized in combination with any one of the first to sixth aspects. In the ninth aspect, the frame (410) includes a first thermal adhesive having a first softening point. The partition (420) includes a second thermal adhesive having a second softening point equal to or higher than the first softening point. The first glass substrate (200) and the second glass substrate (300) are hermetically bonded to each other by temporarily melting the first thermal adhesive at a first melting temperature (Tm1) equal to or higher than the first softening point. The partition (420) is changed in shape by temporarily melting the second thermal adhesive at a second melting temperature (Tm2) equal to or higher than the second softening point. The getter has an activation temperature lower than a temperature (evacuation temperature) Te in evacuating the first space (510) through the gas passage (600), the second space (520), and the outlet (700). The first softening point and the second softening point are higher than the temperature (evacuation temperature) Te in evacuating the first space (510) through the gas passage (600), the second space (520), and the outlet (700).

According to the ninth aspect, it is possible to recover the adsorbability of the gas adsorbent (60) in evacuating the first space (510) through the gas passage (600), the second space (520), and the outlet (700), and additionally to lower a probability that the gas passage (600) is closed as a result of change in the shape of the partition (420) in such evacuating.

The temporary assembly (100), of the tenth aspect according to the present invention, of glass panel unit is for producing the glass panel unit (10) of any one of the first to ninth aspects, and includes: a first glass substrate (200); a second glass substrate (300) placed opposite the first glass substrate (200); a frame (410) placed between the first glass substrate (200) and the second glass substrate (300) to hermetically bond the first glass substrate (200) and the second glass substrate (300) to each other; an inside space (500) enclosed by the first glass substrate (200), the second glass substrate (300), and the frame (410); a partition (420) dividing the inside space (500) into a first space (510) and a second space (520); a gas passage (600) interconnecting the first space (510) and the second space (520) in the inside space (500); an outlet (700) interconnecting the second space (520) and an outside space; and a gas adsorbent (60) placed in the first space (510) and including a getter.

According to the tenth aspect, it is possible to obtain the glass panel unit (10) which does not have the outlet (700) and an evacuation pipe (810) but has improved thermal insulating properties.

The completed assembly (110) of glass panel unit, of the eleventh aspect according to the present invention is for producing the glass panel unit (10) of any one of the first to ninth aspects, and includes: a first glass substrate (200); a second glass substrate (300) placed opposite the first glass substrate (200); a frame (410) placed between the first glass substrate (200) and the second glass substrate (300) to hermetically bond the first glass substrate (200) and the second glass substrate (300) to each other; an inside space (500) enclosed by the first glass substrate (200), the second glass substrate (300), and the frame (410); a separator (42) dividing the inside space (500) into an evacuated space (50) and a second space (520); an outlet (700) interconnecting the second space (520) and an outside space; and a gas adsorbent (60) placed in the evacuated space (50) and including a getter. The separator (42) is formed by changing a shape of a partition (420) dividing the inside space (500) into a first space (510) and the second space (520), subsequent to evacuating the first space (510) through a gas passage (600) interconnecting the first space (510) and the second space (520) in the inside space (500), the second space (520), and the outlet (700), to convert the first space (510) into the evacuated space (50), so as to close the gas passage (600).

According to the eleventh aspect, it is possible to obtain the glass panel unit (10) which does not have the outlet (700) and an evacuation pipe (810) but has improved thermal insulating properties.

The method of the twelfth aspect according to the present invention for manufacturing glass panel unit, includes: an assembling step of preparing a temporary assembly (100) including: a first glass substrate (200); a second glass substrate (300) placed opposite the first glass substrate (200); a frame (410) placed between the first glass substrate (200) and the second glass substrate (300) to hermetically bond the first glass substrate (200) and the second glass substrate (300) to each other; an inside space (500) enclosed by the first glass substrate (200), the second glass substrate (300), and the frame (410); a partition (420) dividing the inside space (500) into a first space (510) and a second space (520); a gas passage (600) interconnecting the first space (510) and the second space (520); an outlet (700) interconnecting the second space (520) and an outside space; and a gas adsorbent (60) including a getter; a hermetically enclosing step of obtaining a completed assembly (110) by: converting the first space (510) into an evacuated space (50) by evacuating the first space (510) through the gas passage (600), the second space (520), and the outlet (700) and changing a shape of the partition (420) to close the gas passage (600) to form a separator (42) so that part of the frame (410) corresponding to the evacuated space (50) and the separator (42) constitute a seal (40) hermetically bonding the first glass substrate (200) and the second glass substrate (300) so as to enclose the evacuated space (50); and a removing step of removing part including the second space (520) from the completed assembly (110) to obtain a glass panel unit which is a predetermined part (10) including the evacuated space (50).

According to the twelfth aspect, it is possible to obtain the glass panel unit (10) which does not have the outlet (700) and an evacuation pipe (810) but has improved thermal insulating properties.

The method of the thirteenth aspect according to the present invention for manufacturing glass panel unit would be realized in combination with the twelfth aspect. In the thirteenth aspect, the frame (410) includes a first thermal adhesive having a first softening point. The partition (420) includes a second thermal adhesive having a second softening point equal to or higher than the first softening point. In the assembling step, the first glass substrate (200) and the second glass substrate (300) are hermetically bonded to each other by temporarily melting the first thermal adhesive at a first melting temperature (Tm1) equal to or higher than the first softening point. In the hermetically enclosing step, the separator (42) is formed by changing the shape of the partition (420) by temporarily melting the second thermal adhesive at a second melting temperature (Tm2) equal to or higher than the second softening point. The first melting temperature (Tm1) is lower than the second melting temperature (Tm2).

According to the thirteenth aspect, it is possible to lower a probability that the gas passage (600) is closed as a result of change in the shape of the partition (420) in hermetically bonding the first glass substrate (200) and the second glass substrate (300).

The method of the fourteenth aspect according to the present invention for manufacturing glass panel unit would be realized in combination with the twelfth aspect. In the fourteenth aspect, in the hermetically enclosing step, the first space (510) is evacuated through the gas passage (600), the second space (520), and the outlet (700) at an evacuation temperature (Te). The evacuation temperature (Te) is higher than an activation temperature of the getter.

According to the fourteenth aspect, it is possible to recover the adsorbability of the gas adsorbent (60) in evacuating the first space (510) through the gas passage (600), the second space (520), and the outlet (700).

The method of the fifteenth aspect according to the present invention for manufacturing glass panel unit would be realized in combination with the fourteenth aspect. In the fifteenth aspect, the frame (410) includes a first thermal adhesive having a first softening point. The partition (420) includes a second thermal adhesive having a second softening point equal to or higher than the first softening point. In the assembling step, the first glass substrate (200) and the second glass substrate (300) are hermetically bonded to each other by temporarily melting the first thermal adhesive at a first melting temperature (Tm1) equal to or higher than the first softening point. In the hermetically enclosing step, the separator (42) is formed by changing the shape of the partition (420) by temporarily melting the second thermal adhesive at a second melting temperature (Tm2) equal to or higher than the second softening point. The evacuation temperature (Te) is lower than the first melting temperature (Tm1) and the second melting temperature (Tm2).

According to the fifteenth aspect, it is possible to lower a probability that the gas passage (600) is closed as a result of change in the shape of the partition (420) in evacuating the first space (510) through the gas passage (600), the second space (520), and the outlet (700).

The method of the sixteenth aspect according to the present invention for manufacturing glass panel unit would be realized in combination with the fifteenth aspect. In the sixteenth aspect, the first melting temperature (Tm1) is lower than the second melting temperature (Tm2).

According to the sixteenth aspect, it is possible to lower a probability that the gas passage (600) is closed as a result of change in the shape of the partition (420) in hermetically bonding the first glass substrate (200) and the second glass substrate (300).

The method of the seventeenth aspect according to the present invention, for manufacturing glass panel unit, would be realized in combination with any one of the twelfth to sixteenth aspects. In the seventeenth aspect, in the hermetically enclosing step, the separator (42) is formed by changing the shape of the partition (420) while evacuating the first space (510) through the gas passage (600), the second space (520), and the outlet (700).

According to the seventeenth aspect, it is possible to lower a probability that the degree of vacuum of the evacuated space (50) becomes worse in forming the separator (42) by changing the shape of the partition (420).

The invention claimed is:

1. A method for manufacturing glass panel unit, comprising:
    an assembling step of preparing a temporary assembly including: a first glass substrate; a second glass substrate placed opposite the first glass substrate; a frame placed between the first glass substrate and the second glass substrate to hermetically bond the first glass substrate and the second glass substrate to each other; an inside space enclosed by the first glass substrate, the second glass substrate, and the frame; a partition dividing the inside space into a first space and a second space; a gas passage interconnecting the first space and the second space; an outlet interconnecting the second space and an outside space; and a gas adsorbent placed in the first space and including a getter;
    a hermetically enclosing step of obtaining a completed assembly by: converting the first space into an evacuated space by evacuating the first space through the gas passage, the second space, and the outlet and changing a shape of the partition to close the gas passage to form a separator so that part of the frame corresponding to the evacuated space and the separator constitute a seal hermetically bonding the first glass substrate and the second glass substrate so as to enclose the evacuated space; and
    a removing step of removing part including the second space from the completed assembly to obtain a glass panel unit which is a predetermined part including a first glass panel which is part of the first glass substrate that corresponds to the evacuated space, a second glass panel which is part of the second glass substrate that corresponds to the evacuated space, the seal, the evacuated space, and the gas adsorbent.

2. The method of claim 1, for manufacturing glass panel unit, wherein:
the frame includes a first thermal adhesive having a first softening point;
the partition includes a second thermal adhesive having a second softening point equal to or higher than the first softening point;
in the assembling step, the first glass substrate and the second glass substrate are hermetically bonded to each other by temporarily melting the first thermal adhesive at a first melting temperature equal to or higher than the first softening point;
in the hermetically enclosing step, the separator is formed by changing the shape of the partition by temporarily melting the second thermal adhesive at a second melting temperature equal to or higher than the second softening point; and
the first melting temperature is lower than the second melting temperature.

3. The method of claim 1, wherein:
in the hermetically enclosing step, the first space is evacuated through the gas passage, the second space, and the outlet at an evacuation temperature; and
the evacuation temperature is higher than an activation temperature of the getter.

4. The method of claim 3, for manufacturing glass panel wherein:
the frame includes a first thermal adhesive having a first softening point;
the partition includes a second thermal adhesive having a second softening point equal to or higher than the first softening point;
in the assembling step, the first glass substrate and the second glass substrate are hermetically bonded to each other by temporarily melting the first thermal adhesive at a first melting temperature equal to or higher than the first softening point;
in the hermetically enclosing step, the separator is formed by changing the shape of the partition by temporarily melting the second thermal adhesive at a second melting temperature equal to or higher than the second softening point; and
the evacuation temperature is lower than the first melting temperature and the second melting temperature.

5. The method of claim 4, wherein
the first melting temperature is lower than the second melting temperature.

6. The method of claim 1, wherein
in the hermetically enclosing step, the separator is formed by changing the shape of the partition while evacuating the first space through the gas passage, the second space, and the outlet.

7. The method of claim 1, wherein
in the hermetically enclosing step, the getter is activated before formation of the partition.

* * * * *